United States Patent [19]
Sutton et al.

[11] Patent Number: 5,117,444
[45] Date of Patent: May 26, 1992

[54] HIGH ACCURACY PEDOMETER AND CALIBRATION METHOD

[75] Inventors: William R. Sutton, 4898 Dolores Dr., Pleasanton, Calif. 94566; Scott L. Noble, San Jose, Calif.

[73] Assignee: W. Ron Sutton, Pleasanton, Calif.

[21] Appl. No.: 559,076

[22] Filed: Jul. 30, 1990

[51] Int. Cl.⁵ .................................................. G01C 22/00
[52] U.S. Cl. .................................... 377/24.2; 364/561; 377/26
[58] Field of Search ................ 377/24.1, 24.2, 26, 377/5; 364/561, 566

[56] References Cited

U.S. PATENT DOCUMENTS

| | | | |
|---|---|---|---|
| 4,223,211 | 9/1980 | Allsen et al. | 377/24.2 |
| 4,387,437 | 6/1983 | Lowrey et al. | 364/561 |
| 4,741,001 | 4/1988 | Ma | 377/24.2 |
| 4,821,218 | 4/1989 | Potsch | 364/566 |

FOREIGN PATENT DOCUMENTS

| | | | |
|---|---|---|---|
| 0219407 | 12/1983 | Japan | 377/24.2 |
| 0079197 | 4/1988 | Japan | 377/24.2 |

*Primary Examiner*—John S. Heyman
*Attorney, Agent, or Firm*—Richard B. Main

[57] ABSTRACT

A preferred embodiment of the present invention comprises a pedometer having a housing, a weighted pendulum, a magnet and reed switch, a microprocessor, a LCD display, three push-bottons, a hinged door with a spring cam device that holds the door open and shut, and a replaceable belt hook. The entire unit is powered by an oversized lithium battery that has an expected life of seven years. A unique method of user calibration simplifies user input and provides maximum calibration accuracy regardless of operational or stride artifact variations.

17 Claims, 3 Drawing Sheets

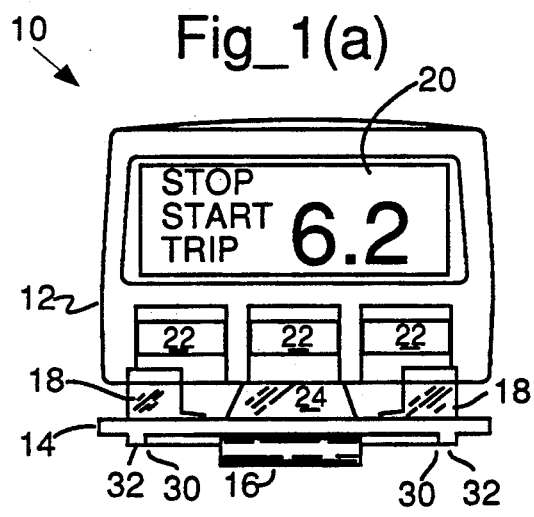
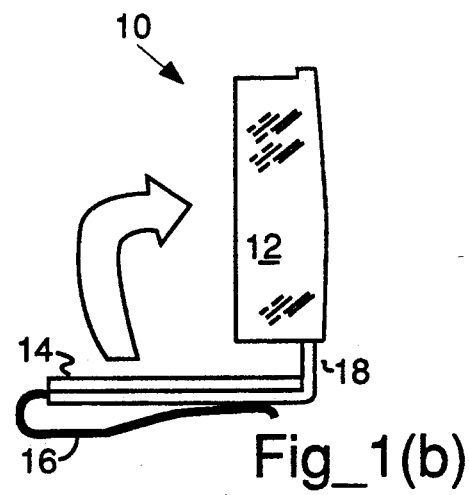
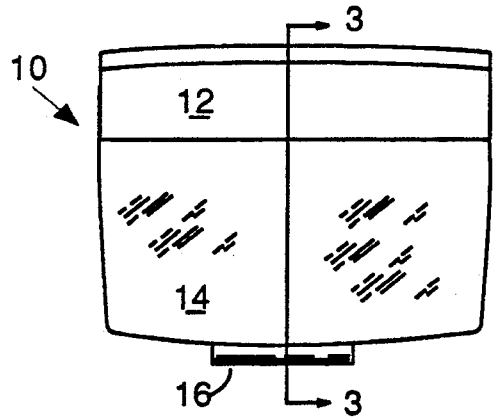
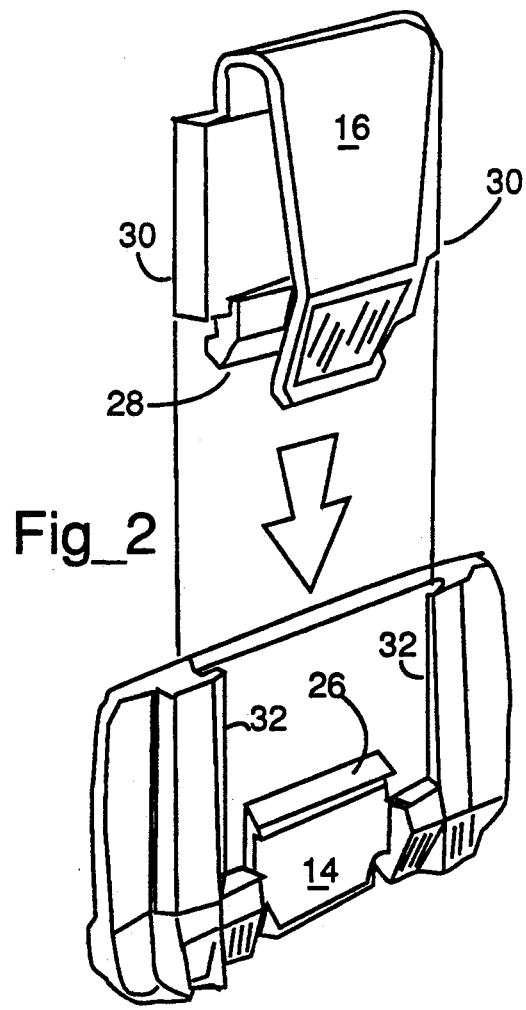

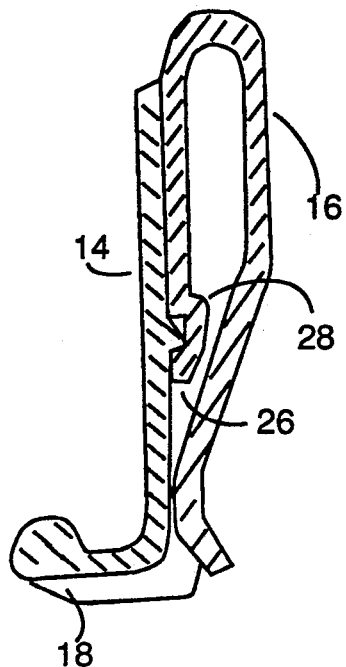
Fig_3
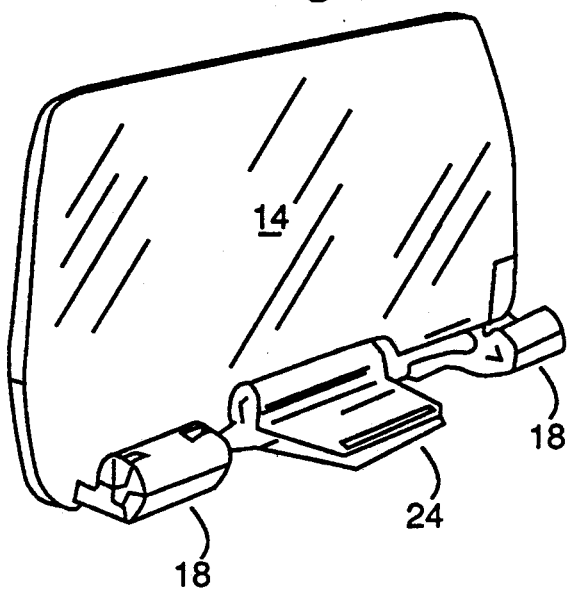
Fig_4
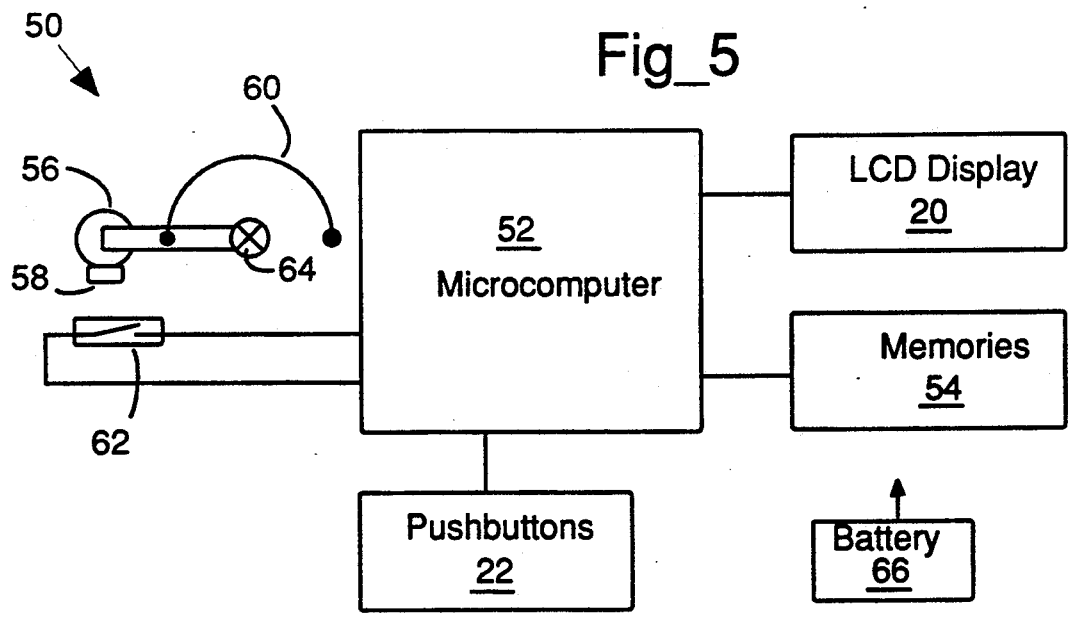
Fig_5

Fig_6
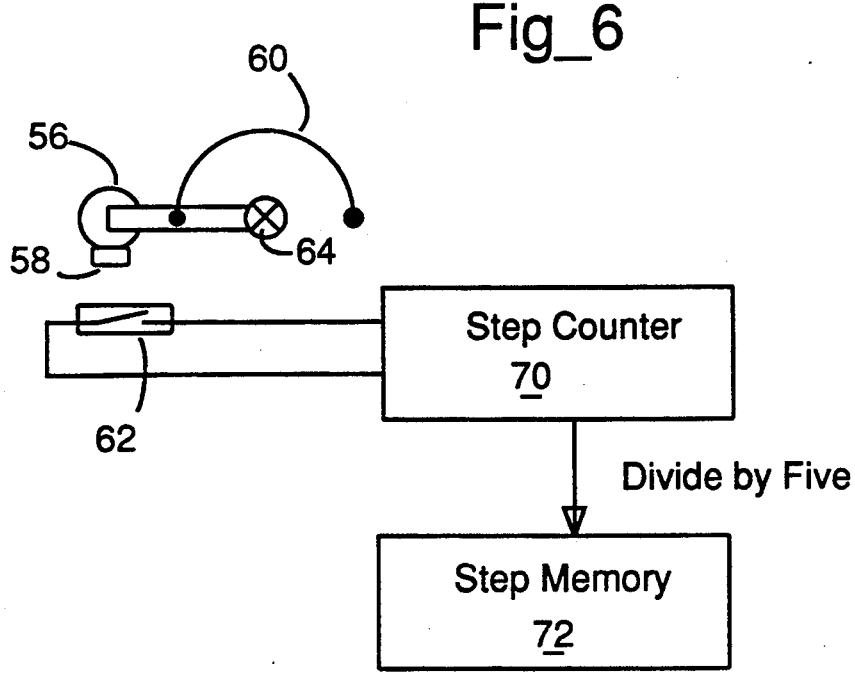
Fig_7
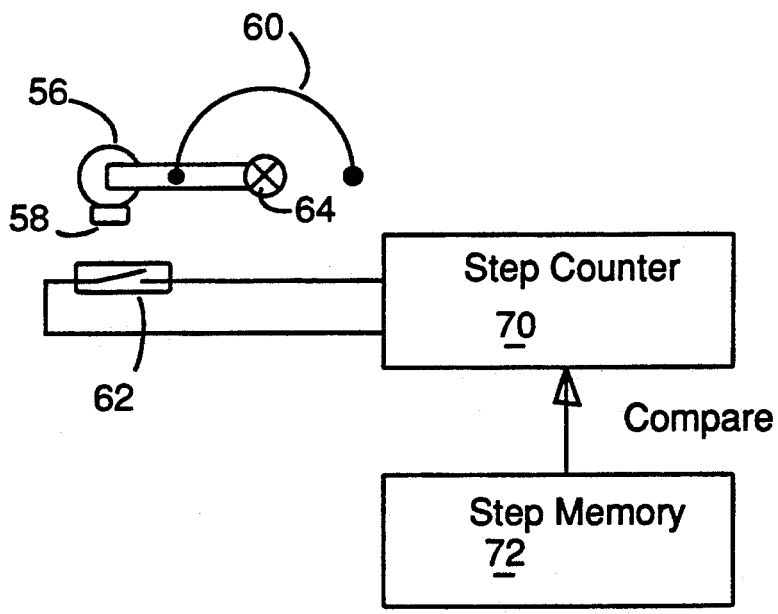

HIGH ACCURACY PEDOMETER AND CALIBRATION METHOD

BACKGROUND OF THE INVENTION

1. Field of the Invention

The invention relates generally to pedometers and specifically to electronic-type multi-event capable devices for the measurement of traveled distances or other activity based on oscillations of position within or outside a gravity field.

2. Description of the Prior Art

Pedometers primarily measure the distance walked or run by a human wearer of the device by virtue of the up and down motion made by the wearer during each stride. Pedometers have also been attached to farm animals to measure physical activity. The distance traveled by a user of a pedometer is the length of the user's stride times the number of strides the user takes. Typical pedometers employ a weighted pendulum suspended horizontally from an axis by a spring. The inertia of the pendulum's weight will cause the pendulum to move in relation to the pedometer each time the wearer takes a stride. The more repeatable a user's activity is from event to event, the more accurate will be the resulting measurement. It is possible for pedometers to measure many other kinds of activity besides walking or running, including mathematical conversion of data to "points" or "indices," not directly related to distance, e.g., aerobic points for playing tennis.

The prior art comprises two ways of detecting the movement of the pendulum, (1) mechanically, and (2) electrically. In mechanical detection pedometers, a disk with teeth around its circumference is attached by a ratchet to the pendulum. (See, U.S. Pat. No. 4,560,861, issued to Kato, et al., on Dec. 24, 1985; and see U.S. Pat. No. 4,322,609, issued to Kato on Mar. 30, 1982.) Each stride causes the ratchet to advance by one or more teeth positions. The length of arc the pendulum is allowed to swing is controlled by adjustable stops. A wide setting, stop-to-stop, sets the pedometer for a long stride, such as in running. A narrow setting is used typically for strolling. The resolution of such pedometers is limited by the distance represented by the arc distance between adjacent teeth on the toothed disk. The resolution is often no greater than one-quarter to one-half foot. In a mile, that can lead to resolution inaccuracies as much as ±250 to ±500 feet.

Electrically instrumented pedometers mimic their mechanical counterparts. In electrical pedometers the weighted pendulum is outfitted with a switch contact that will close each time the pendulum completes a swing. Ordinary switches, however, are prone to intermittent operation and a full swing against the balance spring must be made to ensure contact. Running will subject the weighted pendulum to as much as three G's, and will probably result in good switch contact. But to enable operation during walking, which can produce as little as 0.5 G's, the balance spring must be made very light. Too light a balance spring will allow the weighted pendulum to swing violently, and can cause false readings. The prior art controls balance spring tension with an adjustment. Many manufacturers have only a two-point adjustment, "walk" and "run" , and a few others have continuously adjustable balance spring tensioners (e.g., Yamasa Tokei Meter Co., Ltd., Japan). A large proportion of patents dealing with the prior art are addressed to the problem of controlling balance spring tension. Improved switching in the prior art has been realized by mounting a small permanent magnet to a pendulum made of brass and by placing a reed switch at the outside point of the pendulum's arc. The reed switch has contacts maintained under glass seal, and the magnet on the pendulum need only get close to establish contact. Reed switch pedometers are much more reliable and give fewer false readings than other prior art devices. A Casio mathematical cadence device uses a time-based method, instead of a stride detector. In the time-based method, a user is expected to take a standard length stride each time the device beeps. If the user fails to take a stride, and the device beeps, the Casio device will nevertheless assume a step was taken. A failure by the user to stay in step with the cadence is therefore a major source of error in the Casio pedometer.

Invariably the prior art makes some assumptions about the length of strides taken by the user. A user must enter a stride length into the pedometer, and that length will be used in the future calculations of the distance traveled. These stride estimates are a source of great inaccuracy, because the user may only be guessing at the length of his or her stride, or the estimate of a stride is based on a small, artificial sample. In addition, strides can vary. Artifacts of a user's walk or run can also vary over a few strides, and artifacts of the pedometer's operation can also vary, especially in interaction with different users. A pedometer placed on a user's wrist, as opposed to a user's belt, would generate so many unusual artifacts of motion, that all prior art pedometers would not be able to function with any acceptable accuracy. In addition, the stride resolution of prior art pedometers, as mentioned above, can contribute to inaccurate measurements. And given the small sizes of mechanical pedometers, dialing in the correct stride length can be very difficult. A pedometer that simplifies stride calculation, or eliminates it altogether would be an improvement over the prior art.

Prior art pedometers, generally, cannot be turned on or off. Even electrically instrumented pedometers measure all the time. In addition, none have the ability to store information in multiple registers, and none can track multiple events. An example of a useful multi-event function would be a user's goal to walk 20 miles during five consecutive lunch hours during the week. Event number one would be Monday's walk, event number two would be Tuesday's walk, and so on to event number five being Friday's walk. A sixth event could be the running total walked for the week. Prior art devices could only deal with one of these events, and a user would have to select which one by starting and stopping around the event of interest. Such starting and stopping would clear any previous results, because there is no memory in any of the prior art pedometers. A user would either have to give up knowing the daily totals or the weekly total. Since there is no "off," a user would also have to make a separate record for later reference at the end of the event of interest, because the pedometer will continue to advance with any further physical activity whether related to the particular event or not.

Housings for prior art pedometers and their associated knobs and displays require a user to detach the pedometer from a belt hook or shoe and to bring it close enough to the user's face to see the small numbers, or to open it in such a manner that significant false readings may occur. Such action can jiggle the device and cause false readings to occur, because the pedometer will interpret the jostling as additional strides in the measured event. Belt hooks are also easily broken off and cannot be replaced, thus effectively ending the life of the unfortunate pedometer.

SUMMARY OF THE PRESENT INVENTION

It is therefore an object of the present invention to improve the accuracy of pedometer measurements.

It is a further object of the present invention to allow the accurate measurement of any non-exact, oscillating motion event.

It is a further object of the present invention to simplify the user's calibration of a pedometer.

It is a further object of the present invention to allow at least two users to use the same pedometer without one user's use disturbing the other user's calibration or in progress events.

It is a further object of the present invention to make measurement inherently "unitless" so users can select any convenient unit of measurement.

It is a further object of the present invention to provide a start/stop function to eliminate spurious, non-event measurements before or after an event or during any time-outs. Any remainders should be kept or rounded-off, at the option of the user.

It is a further object of the present invention to eliminate accidental resetting of a pedometer.

It is a further object of the present invention to allow multiple calibrations in one unit, so that different types of events can be accurately measured by the same unit without recalibration between events.

It is a further object of the present invention to provide a pedometer that may be worn on a user's wrist, or any other part of the body. Pedometers can easily be lost when worn on a belt.

It is a further object of the present invention to provide a safety means to prevent inadvertently losing a pedometer from the user's body.

It is a further object of the present invention to eliminate false inputs caused by taking a pedometer off of a user's body to make some reading or setting.

It is a further object of the present invention to eliminate variations in measurements caused by the variability of a user's artifacts associated with walking, running, riding, or other activity.

It is a further object of the present invention to measure all day activity accurately, even though measuring different types of events.

It is a further object of the present invention to eliminate errors stemming from interactions of a user's stride artifacts and a pedometer's operating artifacts.

It is a further object of the present invention to allow measurement of multiple events.

It is a further object of the present invention to provide a running total of several events.

It is a further object of the present invention to have a display that is easily read by middle-aged users at a distance of two to three feet.

It is a further object of the present invention to eliminate dials to input stride lengths.

It is a further object of the present invention to eliminate battery replacement over the useful life of a pedometer.

Briefly, a first embodiment of the present invention comprises a housing having a weighted pendulum, a magnet and reed switch, a microprocessor, a LCD display, three push-buttons, a hinged door with a spring cam device that holds the door open and shut, and a replaceable belt hook. A second embodiment is substantially the same as the first, except a housing suitable for wearing on a user's wrist is substituted. The entire unit in either of these embodiments is powered by an oversized lithium battery that has an expected life of seven years.

An advantage of the present invention is that highly accurate performance is provided to one or more interposing users, whether it's worn on the belt, wrist, or other part of the body.

Another advantage of the present invention is that operation is simplified. Calibration can be set once and no recalibration is required until the user(s) change styles of movement, e.g., walking to running.

Another advantage of the present invention is a second calibration memory allows a first calibration to be stored for, e.g., walking in a first memory, and a second calibration, e.g., for running can be stored in a second memory. Thereafter, a walking or running event can be accommodated with a simple push on a single push-button. Switching between such events is just as easy, and each event can comprise both types of components.

Another advantage of the present invention is that multiple events may be tracked and the events stored in multiple memory registers.

Another advantage of the present invention is running totals of all the events are tracked.

Another advantage of the present invention is that each register/event can be independently zeroed with simple two second push-button operations.

Another advantage of the present invention is that opening the unit does not cause false inputs and readings.

Another advantage of the present invention is that sources of inaccuracy are eliminated or reduced.

Another advantage of the present invention is that the display can be read and operated while still attached to a user's belt. A door flips open that has no latches to break, and snaps shut after the user is done.

Another advantage of the present invention that the display has large numbers and the display output is easily read.

Another advantage of the present invention is that battery replacement is expected to be every seven years, thus for all practical purposes, battery replacement is eliminated over the entire practical marketing life of each unit.

These and other objects and advantages of the present invention will no doubt become obvious to those of ordinary skill in the art after having read the following detailed description of the preferred embodiments which are illustrated in the various drawing figures.

IN THE DRAWINGS

FIG. 1(a) is a front view; FIG. 1(b) is a side view; and FIG. 1(c) is a top view of a pedometer having a preferred embodiment of the present invention;

FIG. 2 is a perspective view of the assembly of the belt clip to the door for the pedometer of FIGS. 1(a)-(c);

FIG. 3 is a cross-section of the belt clip in FIG. 1(c) taken along the line 3—3;

FIG. 4 is a perspective view of the inside of the door for the pedometer of FIGS. 1(a)-(c) and shows the opposite door face of FIG. 2;

FIG. 5 is a block diagram of the electronic circuitry contained within the pedometer of FIGS. 1(a)-(c);

FIG. 6 is a block diagram of the calibrate mode contained within the pedometer of FIGS. 1(a)-(c); and FIG. 7 is a block diagram of the operate mode contained within the pedometer of FIGS. 1(a)-(c).

DESCRIPTION OF THE PREFERRED EMBODIMENT

Referring to FIGS. 1(a)-(c) a pedometer, referred to by the general reference numeral 10, has a housing 12 and a door 14. On the door 14 is a detachable belt clip 16. The door 14 is attached to housing 12 by a pair of hinges 18. When door 14 is closed on housing 12, a LCD display 20 and a plurality of push-buttons 22 will be covered. A tongue 24 is positioned on door 14 such that it enters an opening (not shown) in housing 12 when door 14 is opened. Tongue 24 partially restricts the movement of a weighted pendulum (described below) when door 14 is opened. Tongue 24 also serves to keep LCD display 20 level with the user's eye and ground when being read. The positions and orientations of display 20, hinges 18, door 14, and belt clip 16 are such that a user of pedometer 10 may wear pedometer on his or her belt and simply flip open pedometer while still on the belt to read LCD display 20 and/or to operate push-buttons 22. This method of opening while still on a user's belt and tongue 24 reduce or eliminate false readings that would otherwise be caused by the jiggling of pedometer while attempting to read or set pedometer 10. The detachable feature of belt clip 16 allows replacement of the belt clip 16. The prior art is such that a broken belt clip often meant the whole unit was unusable. The present invention extends the useful life by providing for the inevitable breaking of belt clip 16. Belt clip 16 is held in place on door 14 by an inside snap 26 and an outside snap 28 (detailed in FIG. 2). A pair of opposite edges 30 fit snugly within a pair of guides 32. FIG. 2 shows the relationship of the assembly of belt clip 16 to door 14. Further details of belt clip 16 may be seen in FIG. 3. FIG. 4 clearly shows the relationship of tongue 24 to hinges 18.

FIG. 5 is a block diagram of an electronic system contained within pedometer 10, referred to by the general reference numeral 50. A microcomputer 52 comprises a CPU, RAM, ROM, input/output, and a control program. A plurality of memories 54, allows the microcomputer 52 to track a plurality of events and to display them on LCD display 20. Any remainders existing between events are kept or rounded-off, at the option of the user. A weighted pendulum 56 has a magnet 58, a balance spring 60, and a reed switch 62. Pendulum 56 swings on axis 64 such that magnet 58 comes close enough to reed switch 62 to cause electrical contacts within reed switch 62 to operate. Pendulum 56 will swing approximately once for every stride a user takes and switch contacts in reed switch 62 will open and close approximately once for each said stride. It should be understood that pendulum 56 is an example of an acceleration field sensitive device, and that any acceleration detector could be substituted with acceptable results. For example a solid state unit may be employed. Due to the unique and novel calibration method, described below, it is not necessary, nor very important that pendulum 56 actually swing once sufficiently to operate reed switch 62 for each stride of the user. It may happen that the peculiar characteristics of the user's gait, called artifacts of walking or running, are such that every "X" number of strides produce zero or more than one switch closure per stride in reed switch 62. The prior art is almost universally dependent on one stride producing one swing of a pendulum, such as pendulum 56.

The present invention reduces or eliminates distance measurement errors by a method of calibration that takes into account a user's walking/running artifacts and any artifacts of operation pedometer 10 itself may have, together with any interacting artifacts that exist between the pedometer 10 and the user. To calibrate pedometer 10, a user operates one of the push-buttons 22 to enter into a first or a second calibrate mode. See FIG. 6. A step counter 70 has an output that is divided by five and applied to a step memory 72. Display 20 will indicate entry into each of these modes. The user then walks, runs, or rides a measured half unit of distance, e.g., a half mile. At the end of the measured half mile, the user operates one more of the push-buttons 22, and the first calibration is complete and stored in a first calibration memory within memories 54. See FIG. 7. Thereafter, the step counter 70 is compared with the step memory 72 and a current trip memory and total memory are incremented by a tenth of a whole unit. If the user ran the measured half mile, then pedometer 10 will accurately measure the distance of any subsequent running. Similarly, if the user walked the measured half mile, then pedometer 10 will accurately measure the distance of any subsequent walking. A secondary calibration memory, within memories 54, allows the storage of a second user's calibrated half mile, or it can store the alternate walking or running of a single user's measured half mile in the first calibration memory. In this first exemplary embodiment, during the calibration period, microcomputer 52 counts every fifth switch closure from reed switch 62, effectively dividing the number of switch contacts produced in a half mile by five, and therefore resulting in a count that is equal to the number of switch contacts that can be predicted to occur when the present user repeats the same stride style in a tenth of a mile. Other embodiments could just as acceptably count every fourth, sixth, or any other number; counting every fifth stride, as above, is done for simplicity's sake. It is to be understood that the absolute number of switch closures produced in the measured half mile is relatively unimportant. What is important, is that this user will repeat that same measured number every time he or she travels a tenth of a mile.

Users in Europe, or elsewhere, do not have to measure their travel in miles. Any unit of measure will suffice because the LCD display 20 displays only numbers to one decimal place, and not the name of the distance units. To operate the pedometer 10 so as to show kilometers, the user simply walks a measured half kilometer during the above calibration procedure. As can be seen, even football fields (100 yards) can be used as units of measure, because calibrating from a goal line to the 50 yard line would calibrate pedometer 10 to measure in football field units, or tenths of hundred yards for golfers.

A battery 66 is a lithium type and powers electronic system 50. Preferably a type 2025 is used having 140 mA/hour rating. The battery 66 is sized to last at least seven years, therefore making it a lifetime battery, because the practical life of pedometer 10 is estimated to be no more than five to seven years.

A second embodiment is the same as the first embodiment described above, except the user wears it on his or her wrist. The housing is modified to be worn on a wrist and has a strap, such as is commonly used in wrist watches. The second embodiment appears at first observation to be a wrist watch, and could alternatively and additionally provide conventional stopwatch and time of day functions. The theory of operation is as described above.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A pedometer, comprising:
    an output means to communicate numbers to a user;
    a switching means to select among a plurality of functions and to set a plurality of event values;
    at least one memory to store an event;
    a computing means for calculating the activity of the user from an output pulse stream from an acceleration field detection means for detecting motions of the user;
    an enclosure comprising a housing with an attached flip open door, said flip open door having a means to reduce the sensitivity of said acceleration field detection means; and
    a calibration means for accurately correlating the acceleration field detection means output to activities of a user, the calibration means able to count the total number of output pulses from the acceleration field detection means and to thereafter use said total as being equal to a fraction of a standard unit of measure, the calibration means able to divide said output pulses by a number.

2. A pedometer of claim 1, wherein:
    the calibration means comprises a step counter and a step memory, said step memory containing a value equal to a sub-multiple of a value contained in said step counter during a calibration period.

3. The pedometer of claim 1, wherein:
    the output means comprises a liquid crystal display.

4. The pedometer of claim 1, wherein:
    the switching means comprises a plurality of pushbuttons located next to the output means.

5. The pedometer of claim 1, wherein:
    there are seven memories used to store trip events.

6. The pedometer of claim 5 wherein:
    the memories used to store trip events are semiconductor memories used in association with a microcomputer.

7. The pedometer of claim 1, wherein:
    the computing means comprises a microcomputer having a CPU, a RAM, a ROM, and an input/output port.

8. The pedometer of claim 1, wherein:
    said acceleration field detection means comprises at least one integrated circuit accelerometer.

9. The pedometer of claim 8, wherein:
    each said accelerometer is sensitive to a different plane of acceleration in space.

10. The pedometer of claim 1, wherein:
    said acceleration field detection means comprises a weighted pendulum.

11. The pedometer of claim 1, wherein said enclosure is suitable for wearing on a user's belt.

12. The pedometer of claim 11, wherein:
    said flip open door comprises a detachable belt clip.

13. The pedometer of claim 1, further comprising:
    an enclosure suitable for wearing on a user's wrist, said enclosure having a wrist strap.

14. The pedometer of claim 10, wherein said means for reducing the sensitivity of said acceleration field detection means comprises a tongue which partially restricts said weighted pendulum when said door is open.

15. A method of calibrating a pedometer, comprised of the following steps:
    attaching said pedometer to a user in the manner in which it will be attached for normal use;
    enabling the entry of the pedometer into a calibration mode;
    travelling a predetermined unit of distance while said pedometer is attached and enabled for calibration;
    detecting a number of movements of a user wearing the pedometer while travelling said predetermined distance;
    dividing the number of movements by a number whereby units displayed on an output device will have a correct relationship to a known unit of distance and a distance subsequently traveled after calibration is complete;
    storing said divided number of movements in at least one memory device; and
    ending said calibration mode.

16. The method of claim 15, wherein said predetermined unit of distance is equal to half the unit that is to be displayed.

17. The method of claim 15, wherein said number used as a divisor is equal to five, whereby said pedometer is able to determine distance in terms of tenths of said predetermined unit distance.

* * * * *